United States Patent
Yang et al.

(10) Patent No.: US 11,776,775 B2
(45) Date of Patent: Oct. 3, 2023

(54) SWITCH ASSEMBLY FOR DETECTION UNIT OF SWITCHGEAR OR CONTROLGEAR AND ASSOCIATED COMPARTMENT AND SWITCHGEAR

(71) Applicant: ABB Schweiz AG, Baden (CH)

(72) Inventors: Changzhou Yang, Xiamen (CN); Liming Xu, Xiamen (CN); Liqun Huang, Xiamen (CN)

(73) Assignee: ABB Schweiz AG, Baden (CH)

(*) Notice: Subject to any disclaimer, the term of this patent is extended or adjusted under 35 U.S.C. 154(b) by 359 days.

(21) Appl. No.: 17/154,082

(22) Filed: Jan. 21, 2021

(65) Prior Publication Data

US 2021/0142968 A1 May 13, 2021

Related U.S. Application Data

(63) Continuation of application No. PCT/CN2018/097634, filed on Jul. 27, 2018.

(51) Int. Cl.
*H01H 1/42* (2006.01)
*H01H 31/00* (2006.01)
(Continued)

(52) U.S. Cl.
CPC ............ *H01H 31/003* (2013.01); *H01H 1/42* (2013.01); *H02B 11/02* (2013.01); *H02B 13/02* (2013.01); *H02H 7/22* (2013.01)

(58) Field of Classification Search
CPC ...... H01H 1/42; H01H 31/003; H01H 33/025; H01H 31/28; H02B 11/02; H02B 13/02; H02B 13/0356; H02H 7/22
(Continued)

(56) References Cited

U.S. PATENT DOCUMENTS 4,258,410 A 3/1981 Boersma
4,484,046 A * 11/1984 Neuhouser ......... H01H 33/6661
218/3
(Continued)

FOREIGN PATENT DOCUMENTS

CN 204230134 U 3/2015
CN 104681322 A 6/2015
(Continued)

OTHER PUBLICATIONS

Office Action and Search Report issued for China Application No. 201880069967.1 dated Sep. 7, 2021.
(Continued)

*Primary Examiner* — William A Bolton
(74) *Attorney, Agent, or Firm* — Greenberg Traurig, LLP

(57) ABSTRACT

Embodiments of the present disclosure provide a switch assembly for a detection unit of a switchgear or controlgear. The switch assembly includes a shaft rotatably arranged between opposite side walls of a compartment for accommodating an electrical component, the electrical component coupled to at least one connecting busbar of the switchgear; at least one conductive unit, each conductive unit being rotatable about the shaft between an open position and a close position; and at least one coupling mechanism arranged in the compartment and configured to electrically couple the conductive unit to the detection unit, wherein each coupling mechanism is electrically coupled to the respective connecting busbar when the conductive unit is in the close position, and is electrically decoupled from the respective connecting busbar when the conductive unit is in the open position and is grounded, and wherein each coupling mechanism includes a connecting unit for receiving a terminal of the detection unit positioned outside the compartment. In this way, maintenance or replacement of the detection unit will not affect the airtightness of the compart- (Continued)

ment. Furthermore, the connecting unit can also be used to receive the terminal of other kind of detection unit, such as terminals of test assemblies.

18 Claims, 6 Drawing Sheets

(51) Int. Cl.
*H02B 11/02* (2006.01)
*H02B 13/02* (2006.01)
*H02H 7/22* (2006.01)

(58) Field of Classification Search
USPC .............. 218/79, 80, 12, 45, 55, 67, 70, 75; 200/15, 48 KB, 16 F
See application file for complete search history.

(56) References Cited

U.S. PATENT DOCUMENTS

| | | | |
|---|---|---|---|
| 6,865,072 B2* | 3/2005 | Sato | H01H 33/6661 361/612 |
| 7,002,089 B2 | 2/2006 | Stevenson | |
| 8,581,135 B2* | 11/2013 | Piccoz | H01H 33/126 218/120 |
| 8,779,318 B2* | 7/2014 | Espeseth | H01H 33/24 218/43 |
| 9,177,730 B2* | 11/2015 | Binnendijk | H01H 1/40 |
| 9,429,312 B2* | 8/2016 | Beaver | H01H 9/161 |
| 9,466,955 B2* | 10/2016 | Saxegaard | H02B 13/0352 |
| 9,679,724 B2* | 6/2017 | Abrahamsen | H01H 33/128 |
| 9,691,561 B2 | 6/2017 | West | |
| 10,453,623 B2* | 10/2019 | Sano | H01H 31/28 |
| 2005/0241930 A1 | 11/2005 | Stevenson | |
| 2006/0034037 A1* | 2/2006 | Lammers | H01H 33/022 361/647 |
| 2008/0217153 A1* | 9/2008 | Bottcher | H01H 33/6661 200/48 R |
| 2012/0241300 A1 | 9/2012 | Brasher et al. | |
| 2014/0028319 A1 | 1/2014 | Abe et al. | |
| 2018/0090913 A1 | 3/2018 | Johnson et al. | |

FOREIGN PATENT DOCUMENTS

| | | |
|---|---|---|
| CN | 104900428 A | 9/2015 |
| CN | 204732772 U | 10/2015 |
| CN | 106876208 A | 6/2017 |
| EP | 2728600 B1 | 2/2018 |

OTHER PUBLICATIONS

Extended European Search Report, issued by the European Patent Office, regarding corresponding patent application Serial No. EP 18927447.5; dated Feb. 8, 2022; 7 pages.

India Examination Report, issued by the office of Intellectual Property India, regarding corresponding patent application Serial No. 202147002948; dated Jan. 17, 2022; 4 pages.

Intellectual Property Office of the P.R. China, International Search Report & Written Opinion issued in corresponding Application No. PCT/CN2018/097634, dated May 7, 2019, 9 pp.

* cited by examiner

SWITCH ASSEMBLY FOR DETECTION UNIT OF SWITCHGEAR OR CONTROLGEAR AND ASSOCIATED COMPARTMENT AND SWITCHGEAR

FIELD

Embodiments of the present disclosure generally relate to switch, and specifically to a switch assembly for a detection unit of a switchgear or controlgear as well as associated compartment in a switchgear or controlgear and the associated switchgear or controlgear.

BACKGROUND

Medium voltage and high voltage switchgear are commonly used electrical equipment in transmission and distribution lines. In order to detect the stability of the voltage in the line, voltage transformer (VT) or potential transformer (PT) is usually used. Input terminals of VT or PT are typically coupled to busbars via a switch assembly in a compartment which is used for receiving an electrical device, such as a circuit breaker. In this way, the voltage parameters of the line are obtained by measuring the low voltage at output terminals of VT or PT. In the conventional solution, the input terminals of VT or PT are arranged in the compartment.

In the known solutions, the compartment for receiving the electrical device in the switchgear or controlgear is airtight and filled with insulation gas, such as dry air, $SF_6$ or the like. Furthermore, conductive units, sometimes called conductive knives, are electrically coupled to the busbars by being inserted into clamps arranged on the busbars. For ease of insertion, the conductive units are typically thin and prone to sharp corners. The presence of sharp corners results in a spacing between the phases and between the phases and the walls that should be greater than a predetermined distance. This results in a large volume of the compartment.

SUMMARY

In the conventional solution, the input terminals of VT or PT are arranged in the airtight compartment. In some cases, such as when the VT needs to be replaced, the terminals have to be removed from the compartment. This would inevitably affect the airtightness of the compartment. Furthermore, as mentioned above, the sharp corners present in the conventional switch assembly and/or busbars tend to accumulate charge. This requires a large spacing between busbars and/or between busbars and walls, which in turn leads to a larger volume of the compartment.

In order to at least partially address the above and other potential problems, embodiments of the present disclosure provide a switch assembly for a detection unit of a switchgear or controlgear as well as associated compartment and a switchgear. The switch assembly according to embodiments of the present disclosure provides more uniform electrical field distribution in the compartment, resulting in a more compact compartment and switchgear or controlgear.

In a first aspect, embodiments of the present disclosure provide a switch assembly for a detection unit of a switchgear or controlgear. The switch assembly comprises a shaft rotatably arranged between opposite side walls of a compartment for accommodating an electrical component, the electrical component coupled to at least one connecting busbar of the switchgear or controlgear; at least one conductive unit, each conductive unit being rotatable about the shaft between an open position and a close position; and at least one coupling mechanism arranged in the compartment and configured to electrically couple the conductive unit to the detection unit, wherein each coupling mechanism is electrically coupled to the respective connecting busbar when the conductive unit is in the close position, and is electrically decoupled from the respective connecting busbar when the conductive unit is in the open position and is grounded, and wherein each coupling mechanism comprises a connecting unit for receiving a terminal of the detection unit positioned outside the compartment.

By use of the connecting unit for receiving a terminal of the detection unit positioned outside the compartment, the terminals of the detection unit, such as voltage transformer (VT), are positioned outside the compartment. Maintenance or replacement of the VT will not affect the airtightness of the compartment. Furthermore, the connecting unit can also be used to receive the terminal of other kind of detection unit, such as terminals of test assemblies.

In some embodiments, each connecting unit comprises an opening end hermetically surrounding an opening formed on a bottom wall of the compartment, wherein the terminal is received in the connecting unit through the opening. In this way, the airtightness of the compartment can be ensured conveniently and easily.

In some embodiments, the switch assembly further comprises at least one bumper, each bumper arranged on an end of the conductive unit away from the shaft to avoid bounce when the conductive unit rotates to the close position or the open position. Compared to the conventional solution, by using the bumpers arranged on the end, bounce of the conductive unit when contacting the busbars or the ground can be avoided without being inserted into the clamp on the busbar. That is, the clamp on the busbar can be removed and the conductive unit can be designed to be broader or smoother to avoid sharp corners on the surface.

In some embodiments, the switch assembly further comprises at least one conductive bushing coaxially arranged on the shaft, wherein each conductive unit radially protrudes from the shaft and passes through the respective conductive bushing; and at least one elastic conductive unit arranged in the respective connecting unit, each elastic conductive unit electrically contacting the respective conductive bushing. By using the conductive bushing coaxially arranged on the shaft, the electrical connection between the conductive unit and the terminal can be maintained no matter which position the conductive unit is located. Furthermore, using the conductive bushing can avoid sharp corners caused by other methods of connecting the conductive unit with the shaft, such as welding or the like.

In some embodiments, at least one of the conductive bushing and the conductive unit is of a cylinder shape and is rounded or chamfered to avoid sharp corners on surfaces. With this arrangement, sharp corners can be further avoided and the electric field distribution in the compartment can be more uniform.

In some embodiments, the connecting unit comprises a conductive core for electrically contacting the terminal and an insulating shell enclosing the conductive core, and the conductive core comprises a receiving hole for receiving the elastic conductive unit. In this way, the electric field distribution in the compartment can be more uniform.

In some embodiments, the conductive unit and the conductive bushing are made of conductive material and/or coated with conductive coating. In this way, the conductive units and the conductive bushings and even the switch assembly can be manufactured in a cost effective way.

In some embodiments, the switch assembly further comprises a mounting sleeve arranged on one of the opposite side walls; and a coupling pin arranged on an end of the shaft and hermetically and rotatably received in the respective mounting sleeve; wherein the mounting sleeve is rounded or chamfered to avoid sharp corners on surfaces. By using the rounded or chamfered mounting sleeve, the electric field distribution in the triangle area of the compartment can be more uniform. The triangle area means that an area where the sleeve, the side wall and the shaft meet.

In some embodiments, a closed structure is formed between the conductive bushing and the shaft to prevent metal debris from escaping. In this way, even if friction exists between the bushing and the shaft, the generated metal debris is enclosed in the closed structure without escaping.

In second aspect, a compartment for accommodating an electrical component in a switchgear or controlgear is provided. The compartment comprises opposite side walls substantially parallel to each other; at least one connecting busbar evenly arranged between the opposite side walls and coupled to the electrical component; and a switch assembly mentioned above arranged between the opposite side walls; wherein the connecting busbar is rounded or chamfered. In this way, the electric field distribution in the area adjacent to the connecting busbar is more uniform. This allows the busbars to be more closer under the same insulation conditions.

In some embodiments, the connecting busbar is plate-shaped with curved ends. This allows the connecting busbar to be processed more easily.

In third aspect, a switchgear or controlgear comprising at least one compartment as mentioned above is provided.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Figure 1:
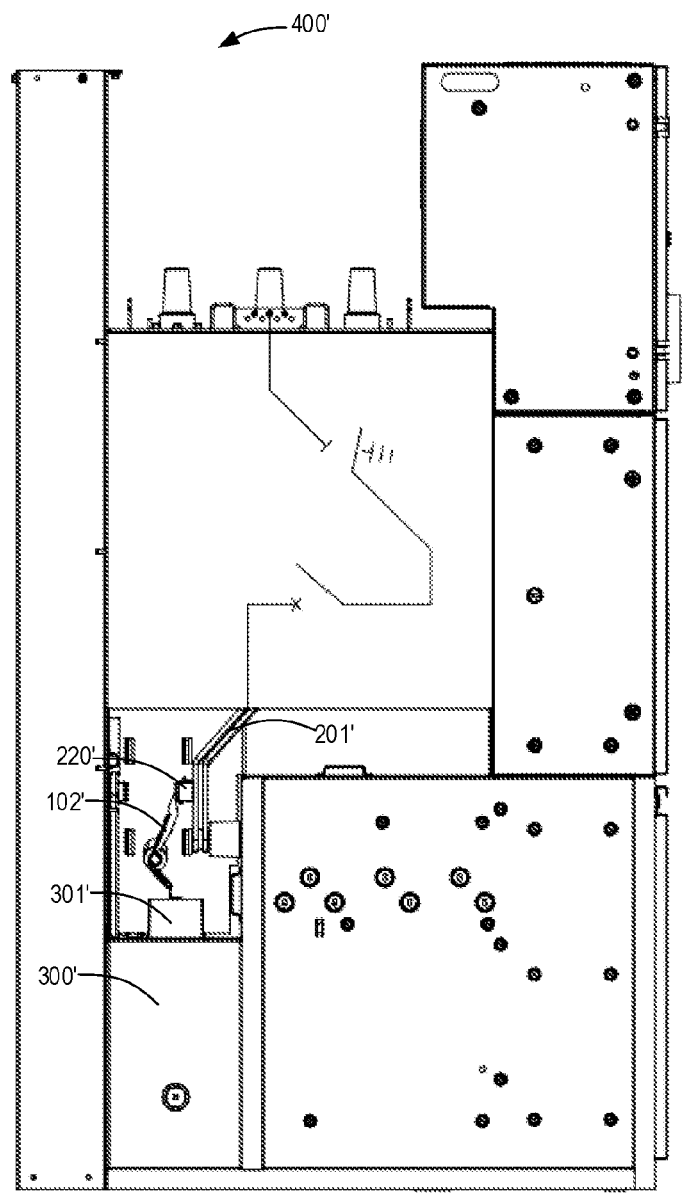
FIG. 1 shows schematic diagrams of a known switchgear or controlgear.

In the conventional switchgear or controlgear 400', as shown in FIG. 1, terminals 301' of a detection unit 300', such as voltage transformer (VT), are usually positioned in a compartment for receiving an electrical device, such as a circuit breaker or the like. However, the compartment is typically airtight and filled with dry air or $SF_6$ to improve the insulation performance. Furthermore, for the sake of testing, maintenance or repair, VT often needs to be replaced. The removing of the terminals from inside of the compartment inevitably affects or deteriorates the airtightness of the compartment.

Figure 2:
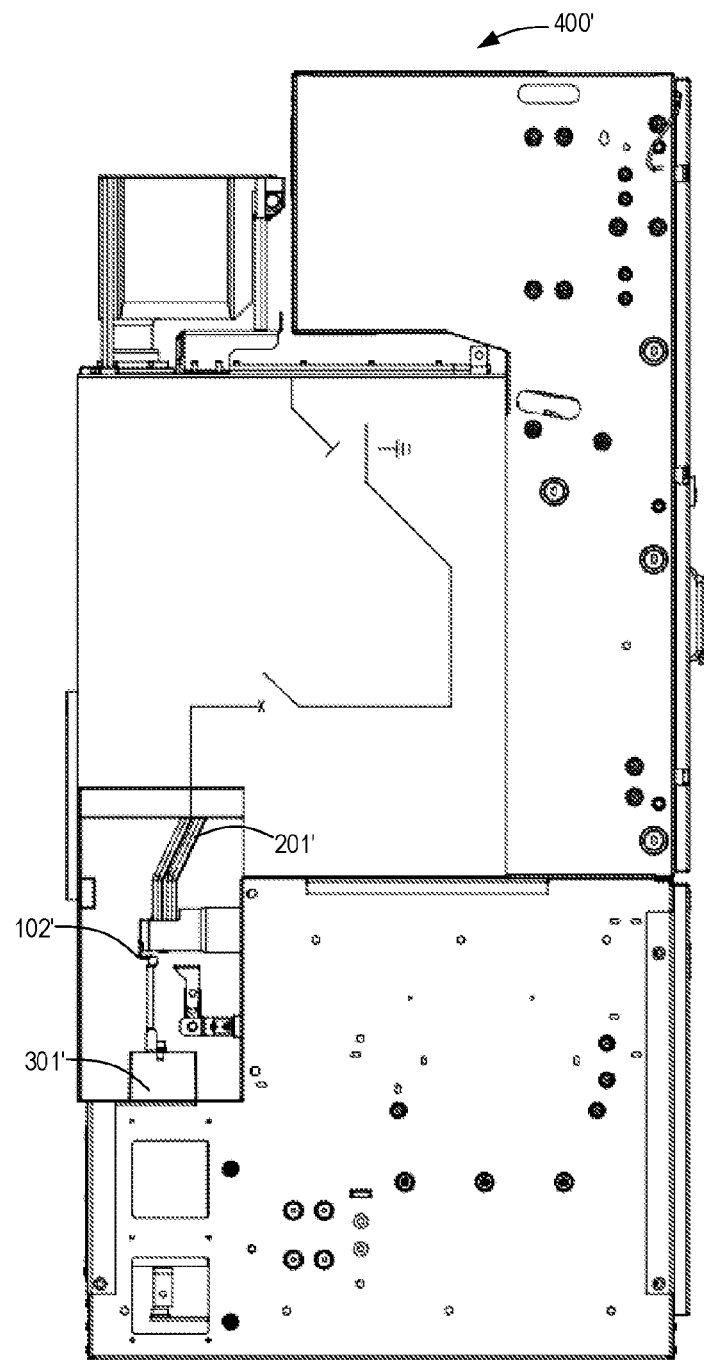
FIG. 2 shows schematic diagrams of another known switchgear or controlgear.

Furthermore, as shown in FIGS. 1 and 2, a known switch assembly is used for controlling the electrical connection between the busbars 201' and the VT 300'. As shown, a conventional switch assembly typically comprises a clamp structure 220' on the busbar to receive a conductive unit to ensure the stability of the connection therebetween. This requires the conductive unit 102' called knife sometimes to be as thin as possible to facilitate insertion into the clamp. As such, at least the conductive unit of the switch assembly inevitably has sharp corners. This exacerbates the non-uniformity of the electric field distribution in the compartment and results in a wider width between the busbars and thus a larger compartment volume.

In order to at least partially address the above and other potential problems, embodiments of the present disclosure provide a switch assembly a detection unit 300, such as VT, of a switchgear. Now some example embodiments will be described with reference to FIGS. 3-7.

Figure 3:
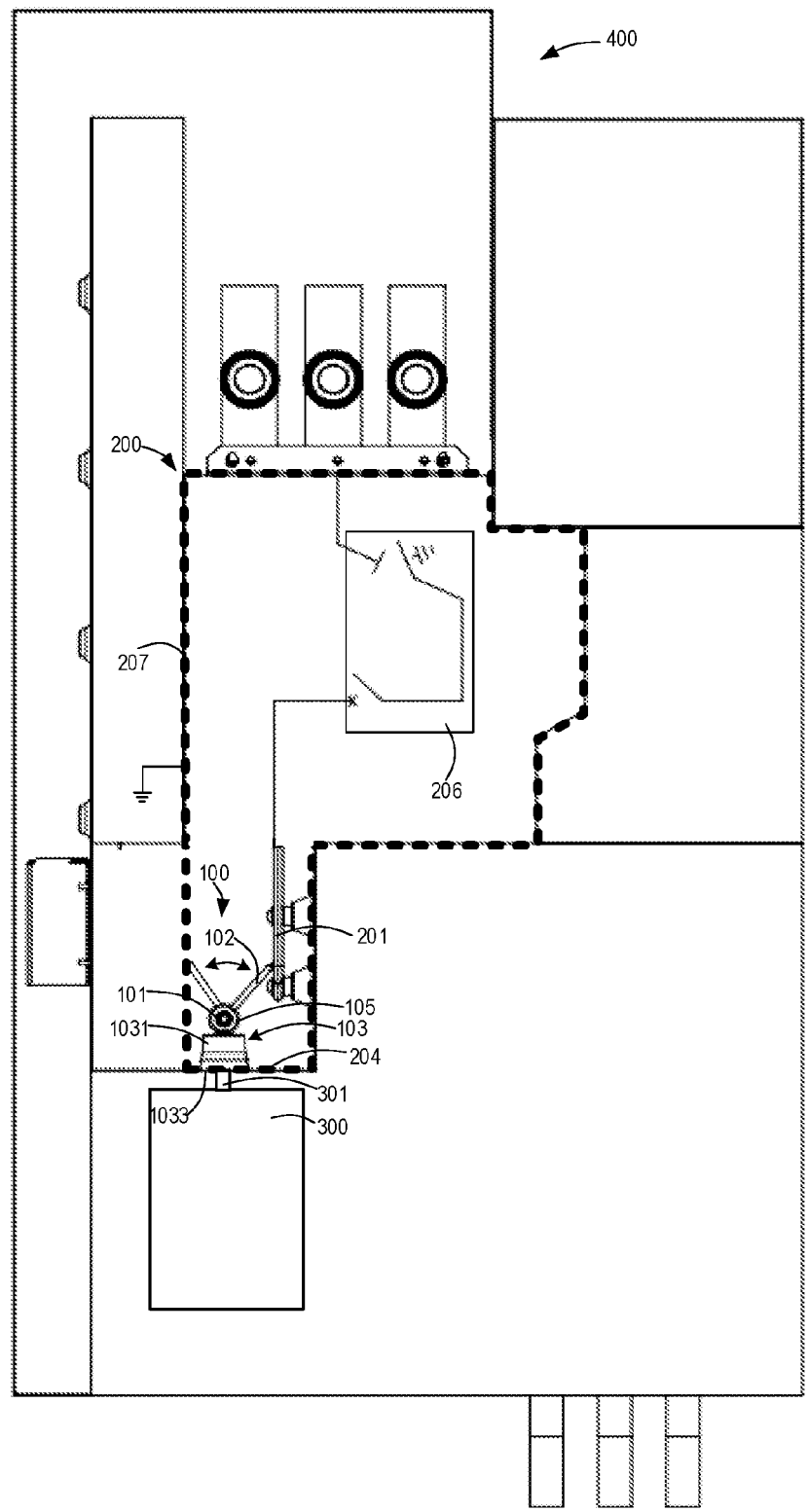
FIG. 3 shows schematic diagrams of a switchgear or controlgear according to embodiments of the present disclosure.
Figure 4:
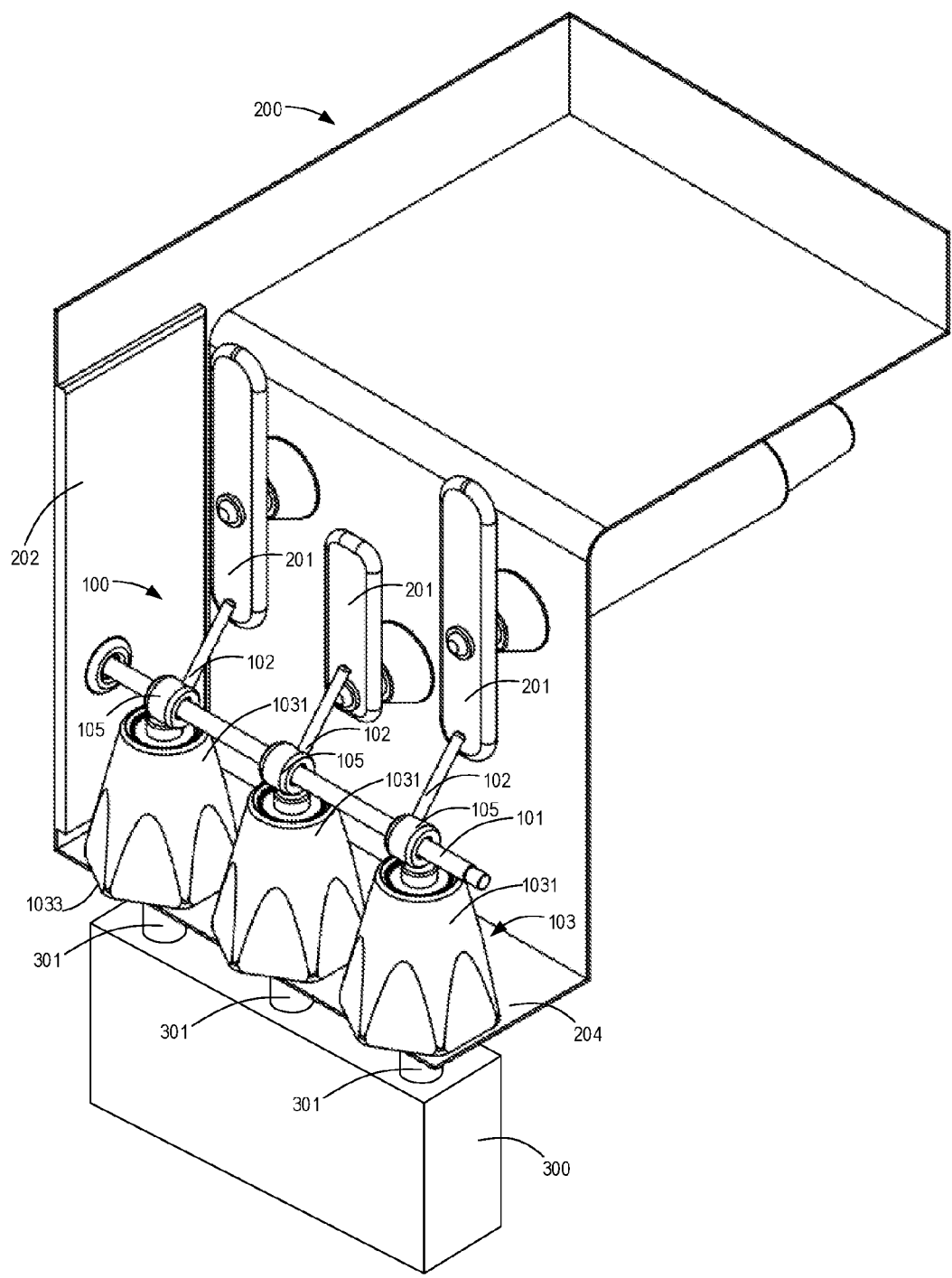
FIG. 4 shows perspective view of a compartment and a switch assembly arranged therein according to embodiments of the present disclosure.

FIG. 3 shows schematic diagrams of the switchgear or controlgear 400 according to embodiments of the present disclosure and FIG. 4 shows perspective view of a compartment 200 and a switch assembly 100 arranged therein according to embodiments of the present disclosure.

In general, the switch assembly 100 according to embodiments of the present disclosure comprises a shaft 101, at least one conductive unit 102 and coupling mechanisms 103. The switch assembly 100 is arranged in a compartment for receiving an electrical device 206 such as a circuit breaker or the like. The electrical device 206 is coupled to busbars 201 in the compartment 200. The opening and closing of an electrical connection between the busbars 201 and the detection unit 300 is achieved by the movement of the conductive unit 102.

The number of the conductive unit 102 can be determined based on the number of phases. For example, the number of conductive unit 102 may be 1, 2, 3 or more. Furthermore, the connecting busbar 201 may be any type of busbar coupled to the electrical component 206. For example, in some embodiments, the connecting busbar 201 may be a tee-off busbars arranged in the compartment 200.

The compartment 200 is airtight and comprises several walls including opposite side walls 202, a bottom wall 204, a rear wall 207 and the like. According to embodiments of the present disclosure, the shaft 100 for carrying the conductive units 102 is arranged between the opposite side walls 202 and is rotatable about its axis. The conductive units 102 can rotate with the shaft 101 between at least two positions an open position and a close position, as shown in FIG. 3. In the open position, the conductive units 102 contact the rear wall 207 which is grounded. As such, the electrical connection between ground and the detection unit 300 is conducted.

In the close position, the conductive units 102 conduct the electrical connection between the coupling mechanisms 103 and the busbars 201. The coupling mechanisms 103 further couple the conductive units 102 to the detection units 300. In this way, high voltage over the busbars is conducted to the terminals 301 of the detection units 300.

Compared to known conventional solutions, according to embodiments of the present disclosure, the terminals of the detection unit 300 can be positioned outside the compartment 200. Accordingly, each coupling mechanism 103 comprises a connecting unit 1031 for receiving the terminal of the detection unit 300. In this way, when the detection unit 300 needs to be replaced or removed due to maintenance or repair, for example, the airtightness of the compartment 200 will not be affected. In addition to or instead of VT, the detection unit 300 can be any suitable component that can detect or test the performance of voltage over the connecting busbars 201. For example, in some alternative embodiments, the detection unit 200 may also be a test device for testing the performance of the electrical component 206 such as a circuit breaker or the like.

Figure 5:
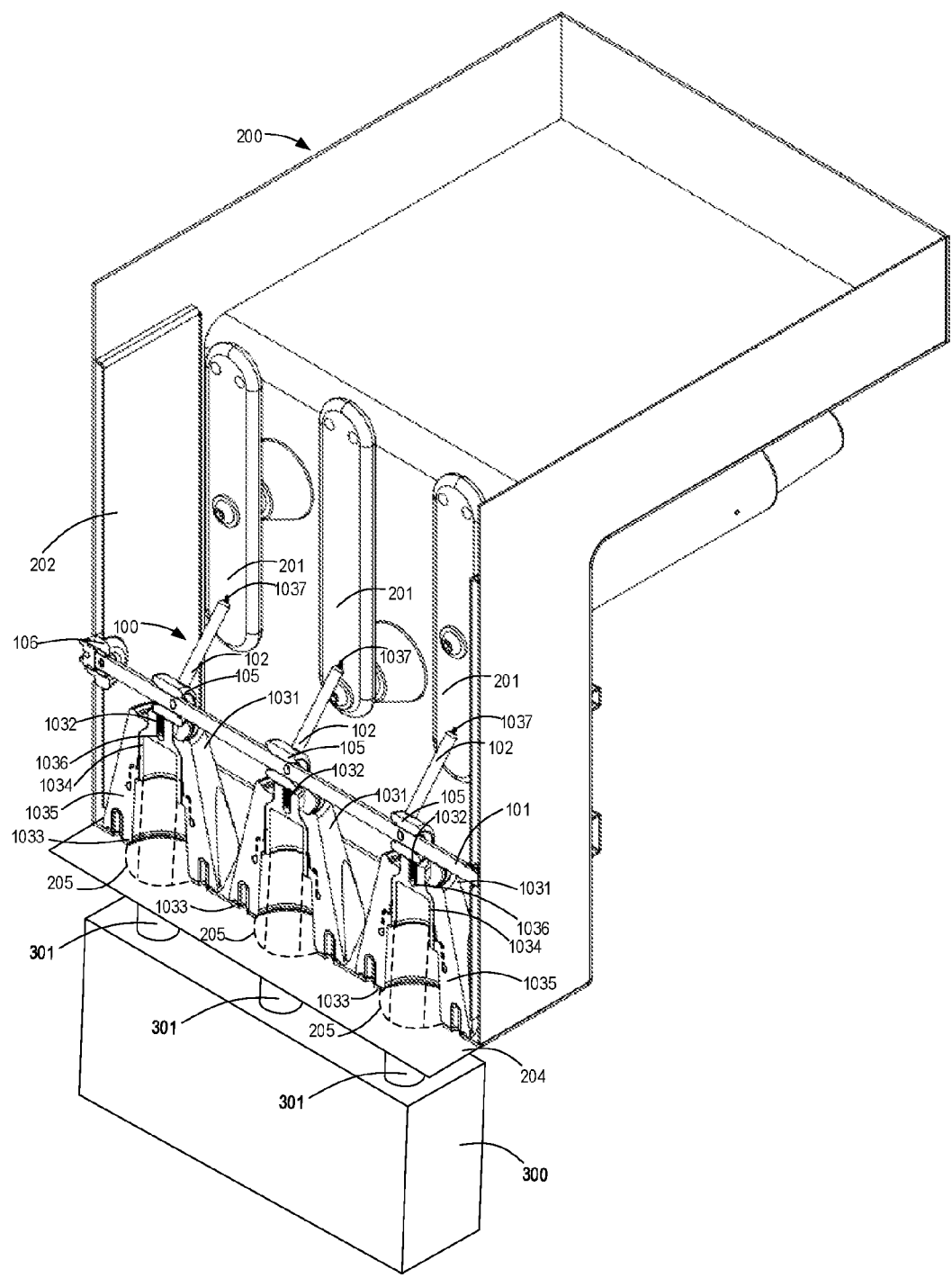
FIG. 5 shows perspective view of a compartment and a switch assembly arranged therein according to embodiments of the present disclosure, wherein a connecting unit is cut open for a clearer view of the internal structure of the connecting unit.

According to embodiments of the present disclosure, the connecting unit 1031 can receive the terminal 301 in any suitable ways. For example, in some embodiments, the connecting unit 1031 may have an opening end 1033 adjacent to the bottom walls 204, as shown in FIGS. 4 and 5. The opening end 1033 may be annular in general and may hermetically surrounds an opening 205 formed on the bottom wall 204. In this way, the terminal 301 may be received in the connecting unit 1031 through the opening 205, as shown in FIG. 5. This approach provides a more robust electrical connection between the connecting unit and the terminal without affecting the airtightness of the compartment 200.

In some embodiments, the connecting unit 1031 may have a conductive core 1034 and an insulating shell 1035 enclosing the conductive core 1034. The conductive core 1034 is used to contact the terminal 301. In this way, only a small portion of the conductive surface of the connecting unit 1031 is exposed in the compartment 200, which promotes the equalization of the electric field distribution in the compartment 200.

The exposed portion of the conductive surface of the connecting unit 1031 may be rounded or chamfered to obtain a further uniform electric field distribution. The insulating shell 1035 may be of any suitable shapes. For example, in some embodiments, the insulating shell 1035 may be of a conical shape which is rounded or chamfered, as shown in FIGS. 4 and 5.

It can be seen from FIG. 5 that the opening end 1033 is the end of the insulating shell 1035 adjacent to the bottom wall 204. The opening end 1033 may be hermetically surrounding the opening 205 in any suitable ways. For example, the opening end 1033 may be fixed to the bottom wall 204 by gluing. In other embodiments, fasters can be used as the coupling mechanism, for example.

It is to be understood that the above embodiments of the connecting unit 1031 are described merely for illustration, without suggesting any limitations as to the scope of the present disclosure. It is possible to use any other suitable structures or arrangements that can seal the opening 205 and reduce the exposed area of the conductive core. For example, in some alternative embodiments, the end of the connecting unit 1031 adjacent to the bottom wall 204 may also be a plane without opening. In this plane, the insulating shell 1035 may surround the conductive core 1034 which is exposed to the outside of the compartment for contacting the terminal 301. Alternatively, in some embodiments, at least the conductive core 1034 of the connecting unit 1031 may be protruded outwards from the bottom wall 204. For example, in these embodiments, at least the conductive core 1034 may forms a male terminal. In this way, the conductive core 1034 can be connected with any type of terminals 301, including flexible terminals, of the detection unit 300.

As mentioned above, the conductive unit 102 may rotate about the shaft 101. In order to maintain the electrical connection between the conductive unit 102 and the connecting unit 1031, in some embodiments, at least one conductive bushing 105 and elastic conductive unit 1032 may be used. Specifically, in these embodiments, each conductive bushing 105 may be coaxially arranged on the shaft 101. The conductive unit 102 may radially protrudes from the shaft 101 and passes through the respective conductive bushing 105. The elastic conductive unit 1031 can be received in a receiving hole 1036 formed in the conductive core 1034 and protrude out slightly from the receiving hole 1036 to contact the conductive bushing 105. Furthermore, this arrangement may also reduce the adhesion of the metal particles to the outer metal surface, which in turn makes the electric field distribution more uniform.

In this way, regardless of how the shaft 101 and the conductive unit 102 rotate, the elastic conductive unit 1032 can contact the outer circumference of the conductive bushing 105 all the time, thereby ensuring an electrical connection between the conductive unit 102 and the conductive core 1034 of the connecting unit 1031. In some embodiments, the conductive bushing 105 and the conductive unit 102 may have cylinder shape with edges rounded or chamfered, for example. In this way, the electric field distribution adjacent to the conductive bushing 105 and the conductive unit 102 can be further uniform.

Furthermore, the connection between the conductive bushing 105 and the shaft 101 ensures that frictional portions of the bushing 105 and the shaft 101 are enclosed in a closed structure formed therebetween. This effectively solves the problem of metal debris escaping and/or adhesion caused by friction and other problems between the frictional portions. In this way, even if friction exists between the bushing 105 and the shaft 101, the generated metal debris is enclosed in the closed structure without escaping.

In some embodiments, the connecting busbars 201 arranged in the compartment 200 may also be rounded or chamfered. In other words, in some embodiments, the conductive components arranged in the compartment 200 are all have relatively rounded shape without any sharp corners. This can avoid concentration of charge caused by the sharp corners and thus ensures the uniform electric field distribution within the compartment 200. The uniform electric field distribution allows for smaller distance between the busbars 201 under equivalent insulation conditions, resulting in a more compact compartment 200.

In some embodiments, the conductive bushing 105 and the conductive unit 102 may be made by applying a conductive coating to the surface of the non-conductive component, such as plastic component or the like. This can further reduce the cost. In some embodiments, the conductive bushing 105 and the conductive unit 102 may be integrally formed. Alternatively, in other embodiments, the conductive bushing 105 and the conductive unit 102 may also be made of conductive material. The conductive material includes, but is not limited to, metal, semiconductors and the like.

Figure 6:
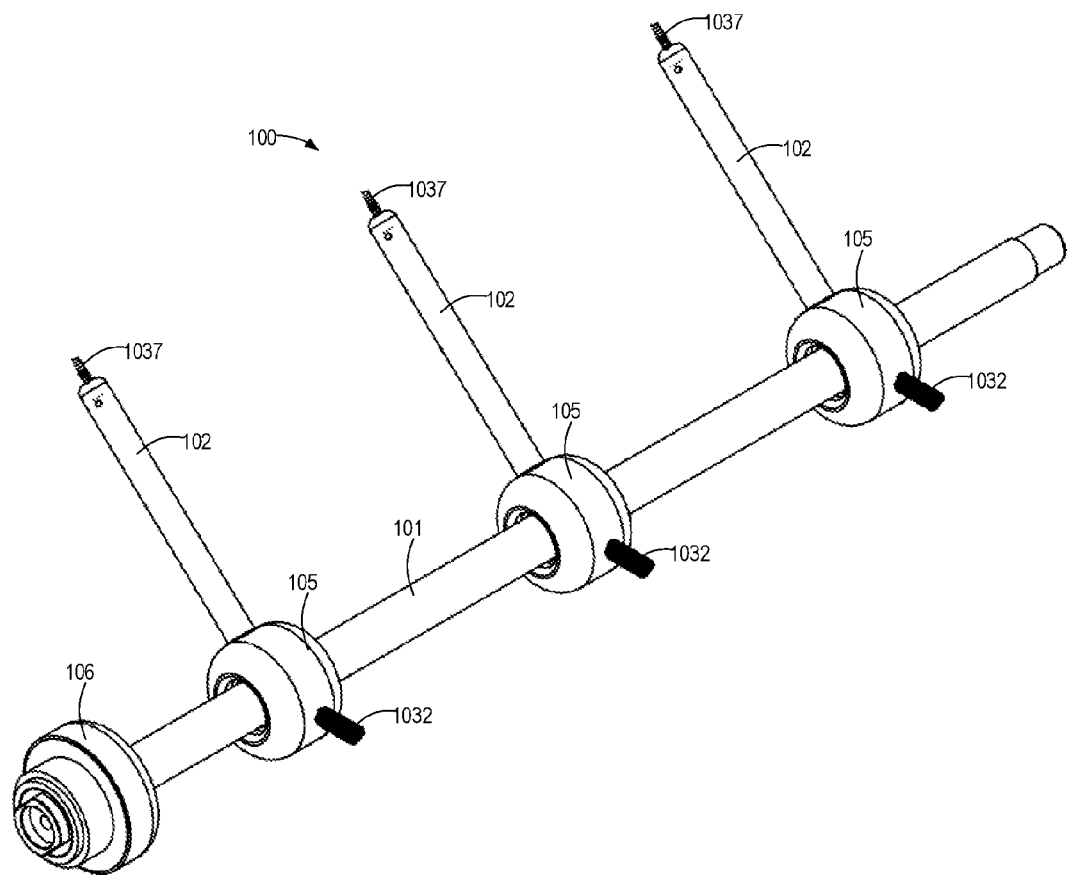
FIG. 6 shows a perspective view of main components of the switch assembly according to embodiments of the present disclosure.

In order to avoid bounce of the conductive unit 102 when contacting the respective busbar 201 or contacting the rear wall 207 which is grounded, in some embodiments, as shown in FIG. 6, the switch assembly 100 may further comprises at least one bumper 1037 each arranged on an end of the conductive unit 102 away from the shaft 101. In those embodiments, when the conductive unit 102 rotates to the close position, the bumper 1037 will contact the busbar 201 first, which provides a buffer for subsequent contact between the conductive unit 102 and the busbar 201. Similarly, when the conductive unit 102 rotates to the open position, the bumper 1037 will contact the rear wall 207 first, which provides a buffer for subsequent contact between the conductive unit 102 and the rear wall 207.

As such, a robust electrical connection between the busbar 201 or the rear wall 207 and the conductive unit 102 can be ensured. Furthermore, in some embodiments, each busbar 201 may be plated-shaped with curved ends to further avoid sharp corners while reducing the cost, as shown in FIGS. 4 and 5.

In aid of the bumpers 1037 to provide buffer when contacting to the busbars 201, the robust connection between the conductive unit 102 and the busbars 201 can be ensured even without the clamp on the busbars 201. As such, the electric field distribution balance is improved while reducing the material cost, and the entire switch assembly 100 can be assembled more easily.

In some embodiments, the bumpers 1037 and/or the elastic conductive units 1032 may be springs, for example. It to be understood that employing spring as the bumpers 1037 and/or the elastic conductive units 1032 in these embodiments is merely for illustration, without suggesting any limitations as to the scope of the present disclosure. Any other suitable structures or arrangements are possible as well. For example, bumpers 1037 and/or the elastic conductive units 1032 may also be any other suitable elastic conductive components.

Figure 7:
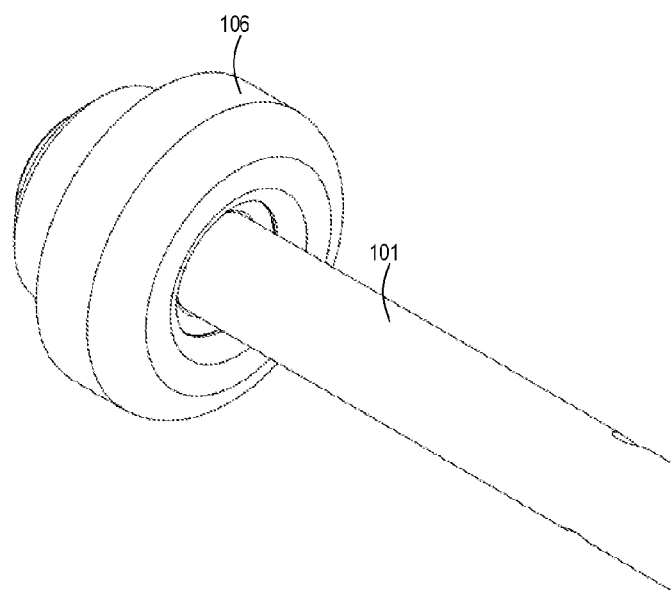
FIG. 7 shows an enlarged view of triangle area of the compartment according to embodiments of the present disclosure.

In some embodiments, the shaft 101 is driven to rotate by a driven device (not shown), such as a motor or the like, positioned outside the compartment 200. In order to connect the output of the driven device with the shaft 101, a sleeve arranged on the side wall 202 may be used. This may result in a triangle area adjacent to the opposite side walls 202. Such a triangle area is an area where the mounting sleeve 106, the side wall 202 and the shaft 101 meet. The triangular region tends to cause sharp corners to make the electric field unbalanced. In order to avoid the sharp corners in the triangle area, at least the part of the mounting sleeve 106 arranged in the compartment 200 has a substantially cylinder shape and is rounded or chamfered, as shown in FIG. 7. In this way, the angle formed between the shaft 101 and the mounting sleeve 106 and between the sleeve 106 and the side walls 202 effectively avoid sharp corners.

In some embodiments, a coupling pin 1011 for coupling the output of the driven device may be arranged on an end of the shaft 101. The coupling pin 101 may be hermetically and rotatably arranged in the mounting sleeve 106. The same arrangement may be used at the other end of the shaft 101. Alternatively, in some embodiments, the other end of the shaft 101 may also be received in a recess formed in the side wall 202 directly. The recess in the side wall 202 may be formed by stamping or any other suitable methods.

As can be seen from the above description, the switch assembly 100 according to embodiments of the present disclosure may achieve more uniform electrical field distribution in the compartment 200. Furthermore, as for the triangle area, a uniform electrical field distribution can be obtained due to the mounting sleeve 106. As a result, the distance between the busbars 201 may be reduced and the compartment 200 can be more compact under same insulation conditions.

For example, in the know solution, for a switchgear or controlgear with a width of 600 mm, $SF_6$ is needed in the compartment to achieve a voltage level of 24 kV. The filing of the dry air in the compartment 200 can only achieve the voltage level of 12 kV or lower. On the contrary, with the arrangement of the switch assembly 100 according to embodiments of the present disclosure, for the switchgear or controlgear with a width of 600 mm, only dry air instead of $SF_6$ is required in the compartment 200 to achieve a voltage level of 24 kV or even higher. As such, the switch assembly according to embodiments of the present disclosure makes the switchgear or controlgear more environmentally friendly.

On the other hand, as to the same filling gas, a more compact switchgear or controlgear can be achieved. For example, in the case of filling $SF_6$ in the compartment 200, the switch assembly according to embodiments of the present disclosure enables a switchgear or controlgear to achieve a voltage level of 24 kV or higher even with a width of 500 mm or less. Furthermore, in the case of filling dry air in the compartment 200, a voltage level of 12 kV or higher can be achieved with a width of 500 mm or less.

In sum, by means of the switch assembly according to embodiments of the present disclosure, the switchgear or controlgear can be made more environmentally friendly and compact. It is to be understood that the above examples about the switchgear or controlgear are described merely for illustration, without suggesting any limitations as to the scope of the present disclosure. It is possible to apply the switch assembly 100 according to embodiments of the present disclosure to any other suitable switchgear or controlgear. For example, in some alternative embodiments, the switch assembly 100 can be applied to the switchgear or controlgear with a voltage level of 48 kV or higher.

Moreover, with the bumpers 1037 arranged on free ends of the conductive units 102, bounce that occurs when the conductive units 102 contact the busbars 201 can be avoided. This arrangement can also effectively avoid sharp corners to obtain a more uniform electrical field distribution in this area. The conductive bushings 105 coupled to the elastic conductive units 1032 arranged in the connecting units can ensure that the elastic conductive unit 1032 contacts the outer circumference of the conductive bushing 105 all the time.

In addition, by use of the connecting units 1031, the terminals of the detection unit 300 can be positioned outside the compartment 200. In this way, the airtightness of the compartment 200 will not be affected even when removing the terminals 301. This arrangement may also allow the detection unit 300 to be any suitable device other than VT.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A switch assembly for a voltage transformer of a switchgear, comprising:
    a shaft rotatably arranged between opposite side walls of a compartment for accommodating an electrical component, the electrical component coupled to at least one connecting busbar of the switchgear;
    at least one conductive unit, each of the at least one conductive unit being rotatable about the shaft between an open position and a close position;
    at least one bumper, each of the at least one bumper arranged on an end of each of the at least one conductive unit away from the shaft to avoid bounce when each of the at least one conductive unit rotates to the close position or the open position; and
    at least one coupling mechanism arranged in the compartment and configured to electrically couple the at least one conductive unit to the voltage transformer,
    wherein each of the at least one coupling mechanism is electrically coupled to a respective connecting busbar when the at least one conductive unit is in the close position, and is electrically decoupled from the respective connecting busbar when the at least one conductive unit is in the open position and is grounded, and
    wherein each of the at least one coupling mechanism comprises a connecting unit for receiving a terminal of the voltage transformer positioned outside the compartment.

2. The switch assembly of claim 1, wherein each connecting unit comprises an opening end hermetically surrounding an opening formed on a bottom wall of the compartment, wherein the terminal is received in the connecting unit through the opening.

3. The switch assembly of claim 1, further comprising:
    at least one conductive bushing coaxially arranged on the shaft, wherein each of the at least one conductive unit radially protrudes from the shaft and passes through a respective conductive bushing; and
    at least one elastic conductive unit arranged in a respective connecting unit, each of the at least one elastic conductive unit electrically contacting the respective conductive bushing.

4. The switch assembly of claim 3, wherein the at least one conductive bushing and the at least one conductive unit is of a cylinder shape and is rounded or chamfered to avoid sharp corners on surfaces.

5. The switch assembly of claim 3, wherein the respective connecting unit comprises a conductive core for electrically contacting the terminal and an insulating shell enclosing the conductive core, and
    the conductive core comprises a receiving hole for receiving the at least one elastic conductive unit.

6. The switch assembly of claim 3, wherein the at least one conductive unit and the at least one conductive bushing are made of conductive material and/or coated with conductive coating.

7. The switch assembly of claim 4, wherein a closed structure is formed between the at least one conductive bushing and the shaft to prevent metal debris from escaping.

8. The switch assembly of claim 1, further comprising:
    a mounting sleeve arranged on one of the opposite side walls; and
    a coupling pin arranged on an end of the shaft and hermetically and rotatably received in a respective mounting sleeve;
    wherein the mounting sleeve is rounded or chamfered to avoid sharp corners on surfaces.

9. A compartment for accommodating an electrical component in a switchgear, the compartment comprising:
    opposite side walls substantially parallel to each other;
    at least one connecting busbar evenly arranged between the opposite side walls and coupled to the electrical component; and
    a switch assembly for a voltage transformer of the switchgear of arranged between the opposite side walls, the switch assembly comprising:
        a shaft rotatably arranged between the opposite side walls of the compartment for accommodating the electrical component, the electrical component coupled to the at least one connecting busbar of the switchgear,
        at least one conductive unit, each of the at least one conductive unit being rotatable about the shaft between an open position and a close position,
        at least one bumper, each of the at least one bumper arranged on an end of each of the at least one conductive unit away from the shaft to avoid bounce when each of the at least one conductive unit rotates to the close position or the open position, and
        at least one coupling mechanism arranged in the compartment and configured to electrically couple the at least one conductive unit to the voltage transformer,
        wherein each of the at least one coupling mechanism is electrically coupled to a respective connecting busbar when the at least one conductive unit is in the close position, and is electrically decoupled from the respective connecting busbar when the at least one conductive unit is in the open position and is grounded, and
        wherein each of the at least one coupling mechanism comprises a connecting unit for receiving a terminal of the voltage transformer positioned outside the compartment;
    wherein the at least one connecting busbar is rounded or chamfered.

10. The compartment of claim 9, wherein the at least one connecting busbar is plate-shaped with curved ends.

11. The compartment of claim 9, wherein each connecting unit comprises an opening end hermetically surrounding an opening formed on a bottom wall of the compartment, wherein the terminal is received in the connecting unit through the opening.

12. The compartment of claim 9, further comprising:
at least one conductive bushing coaxially arranged on the shaft, wherein each of the at least one conductive unit radially protrudes from the shaft and passes through a respective conductive bushing; and
at least one elastic conductive unit arranged in a respective connecting unit, each of the at least one elastic conductive unit electrically contracting the respective conductive bushing.

13. The compartment of claim 12, wherein the at least one conductive bushing and the at least one conductive unit is of a cylinder shape and is rounded or chamfered to avoid sharp corners on surfaces.

14. The compartment of claim 12, wherein the respective connecting unit comprises a conductive core for electrically contacting the terminal and an insulating shell enclosing the conductive core, and
the conductive core comprises a receiving hole for receiving the at least one elastic conductive unit.

15. The compartment of claim 12, wherein the at least one conductive unit and the at least one conductive bushing are made of conductive material and/or coated with conductive coating.

16. The compartment of claim 9, further comprising:
a mounting sleeve arranged on one of the opposite side walls; and
a coupling pin arranged on an end of the shaft and hermetically and rotatably received in a respective mounting sleeve;
wherein the mounting sleeve is rounded or chamfered to avoid sharp corners on surfaces.

17. A switchgear comprising:
at least one compartment for accommodating an electrical component in the switchgear, the at least one compartment comprising:
opposite side walls substantially parallel to each other;
at least one connecting busbar evenly arranged between the opposite side walls and coupled to the electrical component; and
a switch assembly for a voltage transformer of the switchgear arranged between the opposite side walls, the switch assembly comprising:
a shaft rotatably arranged between the opposite side walls of the at least one compartment for accommodating the electrical component, the electrical component coupled to the at least one connecting busbar of the switchgear,
at least one conductive unit, each of the at least one conductive unit being rotatable about the shaft between an open position and a close position,
at least one bumper, each of the at least one bumper arranged on an end of each conductive unit away from the shaft to avoid bounce when each of the at least one conductive unit rotates to the close position or the open position, and
at least one coupling mechanism arranged in the at least one compartment and configured to electrically couple the at least one conductive unit to the voltage transformer,
wherein each of the at least one coupling mechanism is electrically coupled to a respective connecting busbar when the at least one conductive unit is in the close position, and is electrically decoupled from the respective connecting busbar when the at least one conductive unit is in the open position and is grounded, and
wherein each of the at least one coupling mechanism comprises a connecting unit for receiving a terminal of the voltage transformer positioned outside the at least one compartment;
wherein the at least one connecting busbar is rounded or chamfered.

18. The switchgear of claim 17, wherein the at least one connecting busbar is plate-shaped with curved ends.

* * * * *